Figure 1:
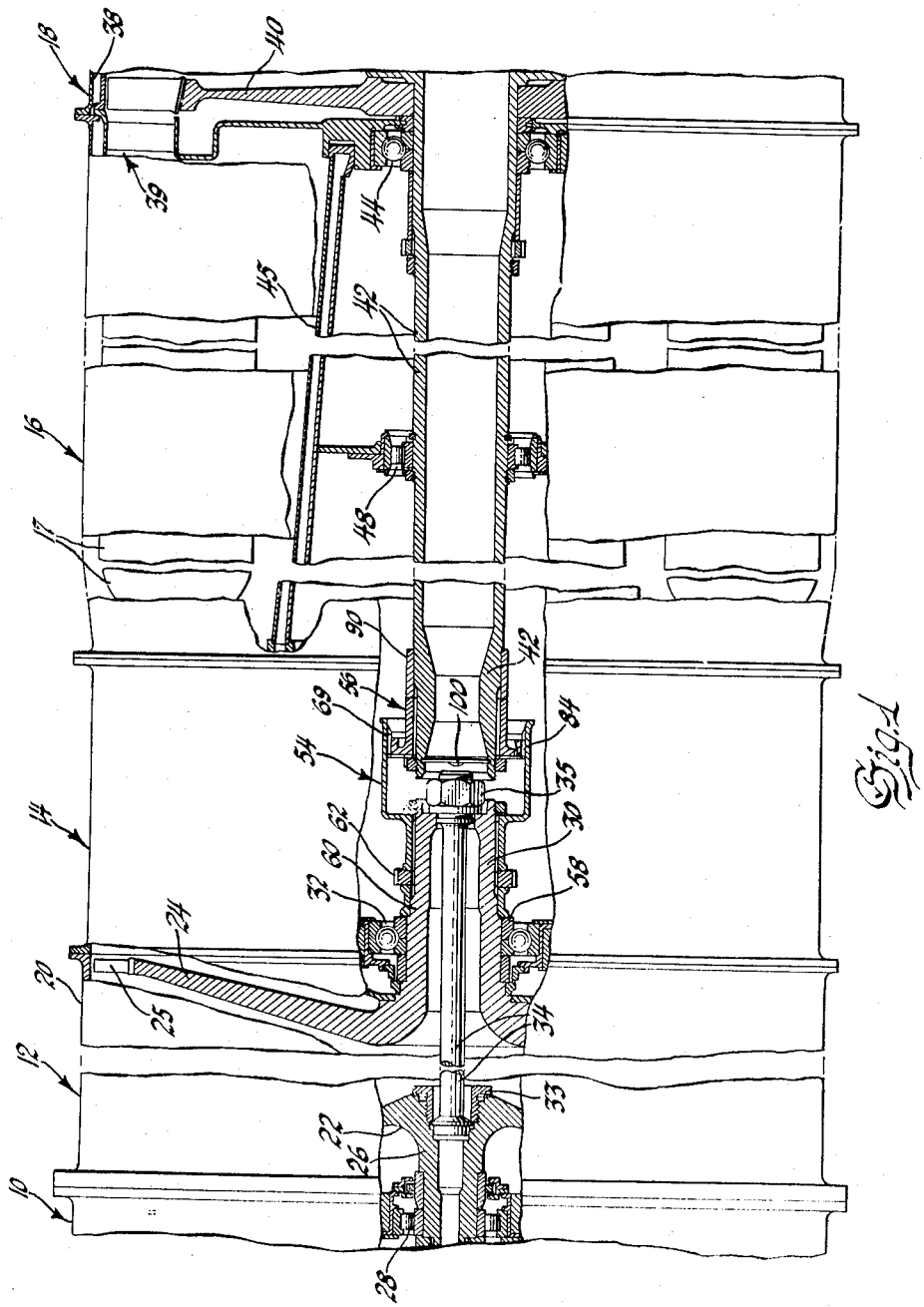

Jan. 31, 1956

A. M. DAVIS 2,732,695

THRUST BALANCING

Filed June 11, 1952

2 Sheets-Sheet 1

Inventor
Arthur M. Davis
By
Willits, Helmig & Caillie
Attorneys

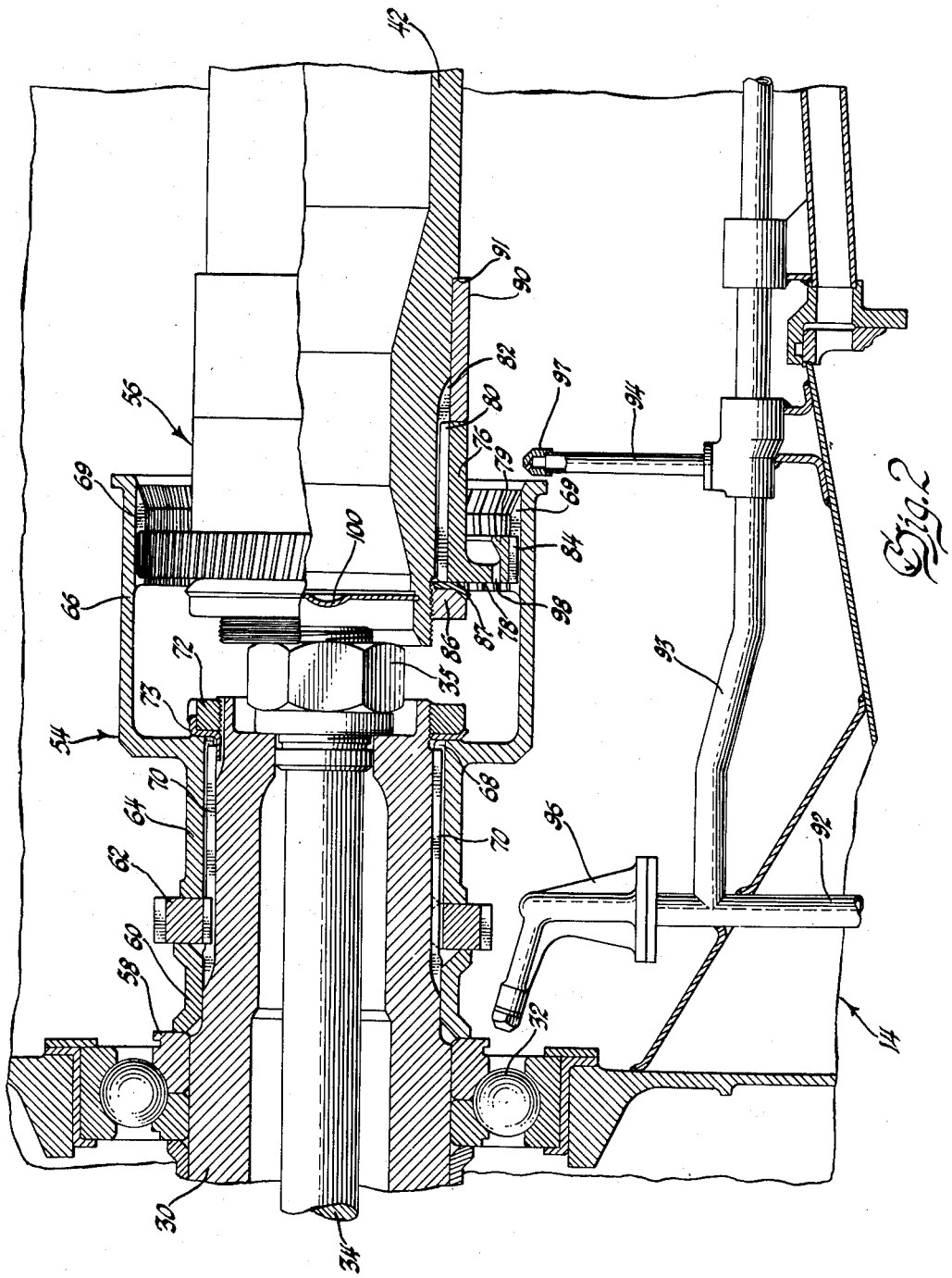

United States Patent Office 2,732,695
Patented Jan. 31, 1956

2,732,695

THRUST BALANCING

Arthur M. Davis, Indianapolis, Ind., assignor to General Motors Corporation, Detroit, Mich., a corporation of Delaware Application June 11, 1952, Serial No. 293,016

2 Claims. (Cl. 64—9)

This invention relates to thrust balancing in rotating machinery and, more particularly, to reduction of thrust loads on the bearings of turbomachines such as gas turbine engines of the type comprising an axial flow compressor and an axial flow turbine which are mounted on individual axially aligned shafts.

The compressor and turbine of such turbo-machines each develop substantial dynamic end thrust due to the fluid pressure loadings thereon which tend to move the compressor and turbine rotors axially relative to their stators. To prevent lengthwise movement of the rotors, a thrust bearing is customarily provided for each shaft to receive the end thrust and to locate the rotor of each machine axially of its stator.

Due to the very large fluid pressures and relatively high speeds and temperatures encountered in such engines, the thrust bearings become excessively large unless some means are provided to relieve them of a portion of the thrust generated by the machine.

In operation, the dynamic end thrust on the rotors tends to separate the turbine from the compressor. The end thrust on the turbine is directed rearwardly toward the exhaust end of the engine, while the thrust load on the compressor is normally in the opposite direction, i. e., forwardly towards the compressor inlet. In typical aircraft gas turbine engines, thermal expansion of the engine may vary the separation between the compressor and the turbine by an appreciable amount. It is, therefore, necessary to couple the compressor and turbine shafts together in such a manner as to permit relative displacement of the rotors. At the same time it is also desirable to balance the end thrusts of the compressor and tribine so as to reduce the total axial load impressed upon the thrust bearings.

Accordingly, the present invention has for its principal objective the provision of an improved thrust balancing coupling device in rotating machinery such as gas turbine engines and the like which allows for expansion of the engine and reduces the axial load on the locating thrust bearings. Other objects are to provide an improved thrust balancing coupling device which is of very simple and compact construction, reliable in operation, and light in weight.

The foregoing ends are achieved in accordance with the invention by interconnecting the compressor and turbine shafts of a gas turbine engine with a helically splined coupling which permits relative axial movement of the adjacent ends of the rotor shafts and produces a force due to the helical splines thereof opposite to the axial thrusts of the compressor and turbine.

The foregoing and other objects, together with the features and advantages attending the invention, will more fully appear from the following description and drawings wherein: Fig. 1 is a longitudinal view of a gas turbine engine with parts shown in section along the axis of the engine; and Fig. 2 is a sectional view taken along the axis of the engine illustrating a thrust balancing coupling device in accordance with a preferred embodiment of the invention.

Referring to the drawings, Fig. 1 represents the general arrangement of a gas turbine aircraft engine which includes a forward frame 10, a multistage axial flow compressor 12, a midframe 14, a combustion section 16, and an axial flow turbine 18. Since the principles of the invention may be understood without reference to details of the engine, the engine will not be described in detail herein in the interest of conciseness.

The forward frame 10 supports the forward end of the engine and includes an inlet passage for the compressor 12. The compressor 12 comprises a casing or stator 10 which supports a number of spaced rows of stator vanes (not shown) and encloses the compressor rotor, the latter being shown partially and comprising a plurality of wheels or disks, only the forward wheel 22 and the rear wheel 24 of which are shown. The rotor wheels each mount a plurality of rotor blades as shown at 25 that cooperate with a sucessive row of vanes, thereby to form sucessive axial stages of the compressor. The forward disk 22 comprises a stub shaft 26 which is supported in a roller bearing 28 mounted in the forward frame 10. The rear disk 24 comprises a stub shaft 30 which is mounted in a ball thrust bearing 32 supported in the forward end of the midframe 14. The compressor wheels and disks are pulled together by a tie bolt 34, secured by a sleeve 33 and a nut 35, so as to form a unitary rotating structure.

The midframe 14 is the main support member for the engine and includes the compressor outlet or diffuser passage through which compressed air is supplied to the combustion section 16. The combustion section contains a plurality of burners or flame tubes 17 wherein fuel is burned to heat and expand the air supplied by the compressor and the heated combustion products are discharged through the turbine 18.

The turbine 18 comprises a turbine nozzle 39 and a casing or stator 38 which supports the nozzle and encloses the turbine rotor, the latter being shown partially and comprising one or more turbine wheels such as 40 mounted on the turbine rotor shaft 42. The turbine shaft 42 is supported adjacent the wheel 40 in a ball thrust bearing 44 mounted in a generally cylindrical frame 45 supported and extending rearwardly from the after end of the engine midframe 14 to the forward end of the turbine. A shiftably mounted roller bearing 48 is provided near the middle of the turbine shaft for damping vibrations of the shaft.

In accordance with the invention, the compressor shaft 30 is coupled to the turbine shaft 42 by an axially extensible coupling device located within the midframe 14 and comprising two helically splined coupling members 54 and 56 which are fixed on adjacent ends of the compressor and turbine shafts, respectively. Mounted on the compressor shaft between the inner bearing race 58 of the thrust bearing 32 and the coupling member 54 are a spacer ring 60 and a ring gear 62, the latter serving to drive a scavenge oil pump (not shown) for the engine lubrication system.

As best shown in Fig. 2, the coupling member 54, hereinafter called the splined sleeve coupling, is an integrally formed tubular structure having a reduced portion 64 and an enlarged portion 66. The reduced portion 64 of the sleeve coupling 54 is internally splined as shown at 68 to engage external splines 70 formed on the end of the compressor shaft. The enlarged portion 66 of the sleeve coupling 54 has a plurality of internal helical splines 69 formed near the end thereof which surrounds the sleeve member 56. The coupling 54 is retained on the compressor shaft by a spinner nut 72 and a lock washer 73.

The coupling member 56 is an integrally formed structure comprising a sleeve portion 76 and a disk portion 78, the sleeve portion 76 being internally splined as shown at 80 to engage external splines 82 formed on the end of the turbine shaft. The disk portion 78 of the coupling member 56 has a plurality of external helical splines 84 formed about the periphery thereof which mesh with the internal helical splines 69 in the coupling member 54 whereby the components 54, 56 of the shaft coupling device are slightly axially movable to permit relative displacement of the rotor shafts. The coupling sleeve 56 is retained on the turbine shaft by a nut 86 and washer 87 which draw the sleeve tightly against one end of a spacer ring 90 which is mounted on a reduced portion of and bears against a shoulder 91 on the turbine shaft.

Oil for lubrication of the bearings and coupling is supplied by the engine lubrication system, only a portion of which is shown. Oil is supplied through oil pressure lines 92, 93, 94 to oil spray nozzles 96, 97 for the compressor thrust bearing 32 and the coupling 54, 56, respectively. The ring portion 78 of the sleeve member 56 has a number of openings as 98 extending therethrough to permit oil from the nozzle 97 to be sprayed into the interior of the coupling sleeve 54 for cooling purposes. The lip 79 on the ring traps the oil, causing it to flow into the coupling, whence it flows out through the splines 69, 84 to lubricate them. To prevent oil from flowing into the turbine shaft, a disk seal 100 is fitted in the end thereof, as shown.

In accordance with the well known characteristic of helical splines, the normal component of tangential pressure on the teeth thereof produces end thrust on the shafts on which the coupling members are mounted. The end thrust thus produced by the helically splined teeth is employed to oppose the dynamic end thrust developed by the compressor and turbine rotors.

The amount of end thrust is a function of the torque and the helical angle of the spline teeth. By increasing the angle or, in other words, by decreasing the pitch of the helix, the thrust can be increased. The most desirable angle for any given installation can be determined by calculation or experiment and will, of course, vary with the installation. Normally, the most desirable value of end thrust developed by the coupling might be the average of the end thrusts of the turbine and compressor, in which case the remaining thrust which must be absorbed by each of the individual thrust bearings 32 and 44 is only half of the difference between the thrusts of the two rotors. However, if desired, some other division can be made. It will be understood that the calculation would be made for normal operating conditions of the engine and that some variation of thrust would occur with changes in operating conditions. Such changes would not greatly affect the beneficial results attending my invention provided proper application of fluid pressure is employed, and a very great reduction in loading of the thrust bearings can be accomplished by the invention.

It may be pointed out that since some slight misalignment of the shafts is always present as well as some vibration, the coupling will slide freely even though the helix angle is very small.

Another advantage of the invention as illustrated over coupling arrangements previously employed in engines of the type illustrated is that it permits the elimination of a bearing commonly provided at the forward end of the turbine shaft. The previous practice has been to use a floating coupling member between the two shafts which necessitated the installation of a radial bearing at the end of the turbine shaft. Since the coupling of the invention can take side thrust, this bearing is unnecessary. It may be noted that this does not increase the radial loading of the bearing 32 but actually diminishes it, since the major radial loads on the bearings are those due to gyroscopic forces when the direction of the axis of the engine changes. Since the gyroscopic forces due to the compressor and turbine would act in opposite directions on the bearing 32, a benefit is obtained from the elimination of the forward turbine bearing. However, the helical spline principle can be applied equally well to a floating coupling member if other engine requirements so dictate. In such case both ends of the coupling would have helical splines of the same diameter and helix angle and the mating splined member at one end would be restrained from relative axial movement by means of snap rings or other suitable retainers.

It will thus be seen that my invention greatly reduces the load on the thrust bearings 32, 44, thereby increasing the service life of the bearings and permitting the use of bearings of lower capacity than would otherwise be required. The coupling and sleeve members 54 and 56 are relatively displaceable along the axis of the engine to permit slight axial movement and thus to allow for thermal expansion effects.

Although the invention has been shown and described herein in relation to its application to a gas turbine engine of a particular type, it will be apparent that the invention is susceptible of embodiment in other forms of gas turbine engines and, in general, in other forms of rotating machinery.

I claim:

1. In an axial flow compressor and turbine each having axially aligned tubular rotor shafts with an axial clearance space therebetween and an axially extensible coupling device for coupling said rotor shafts, said coupling device comprising, in combination, a pair of helically splined coupling members detachably mounted on adjacent ends of the compressor and turbine shafts, one of said members on one of said shafts having an enlarged bell-shaped open end portion with helically splined teeth extending about the interior thereof, the other of said members on the other of said shafts having a ring portion with helically splined teeth about the periphery thereof engaging said internally splined teeth on said bell-shaped coupling member, an annular reservoir integral with the ring portion with openings through said ring portion connecting the reservoir with the interior of said coupling means, lubricating means adjacent the open end of said bell-shaped coupling member introducing lubricating coolant into the reservoir, and sealing means in the ends of said rotor shafts to prevent flow of lubricant therethrough.

2. In an axial flow compressor and turbine each having axially aligned tubular rotor shafts with an axial clearance space therebetween and an axially extensible coupling device for coupling said rotor shafts, said coupling device comprising, in combination, a pair of helically splined coupling members detachably mounted on adjacent ends of the compressor and turbine shafts, one of said members on one of said shafts having an enlarged bell-shaped open end portion with helically splined teeth extending about the interior thereof, the other of said members on the other of said shafts having a ring portion with helically splined teeth about the periphery thereof engaging said internally splined teeth on said bell-shaped coupling member, said ring portion of said other coupling member having a plurality of openings extending therethrough, a lip portion integral with said ring portion, said lip extending axially and radially inwardly and cooperating with said ring to define an annular reservoir in communication with the openings in said ring, lubricating means adjacent the open end of said bell-shaped coupling member introducing lubricant coolant into said reservoir and through said openings into the interior of said coupling means, and sealing means in the ends of said rotor shafts to prevent flow of lubricant therethrough.

References Cited in the file of this patent

UNITED STATES PATENTS

| | | |
|---|---|---|
| 2,174,806 | Soderberg | Oct. 3, 1939 |
| 2,380,113 | Kuhns | July 10, 1945 |
| 2,432,359 | Streid | Dec. 9, 1947 |
| 2,625,790 | Petrie | Jan. 20, 1953 |

FOREIGN PATENTS

| | | |
|---|---|---|
| 624,273 | Great Britain | June 1, 1949 |
| 658,778 | Great Britain | Oct. 10, 1951 |